United States Patent [19]

Pellegrino

[11] E Patent Number: Re. 33,083

[45] Reissued Date of Patent: Oct. 10, 1989

[54] CONTROLLED DISPENSING APPARATUS

[76] Inventor: Raymond W. Pellegrino, 1650 Cardinal Dr., Coatesville, Pa. 19320

[21] Appl. No.: 154,402

[22] Filed: Feb. 9, 1988

Related U.S. Patent Documents

Reissue of:

[64] Patent No.: 4,569,463
Issued: Feb. 11, 1986
Appl. No.: 578,811
Filed: Feb. 10, 1984

[51] Int. Cl.[4] ..... B67D 5/06; G01F 11/26

[52] U.S. Cl. ..... 222/181; 222/288; 222/434

[58] Field of Search ..... 222/180–181, 222/185, 288, 305–306, 434, 173, 282, 287, 424.5, 425, 438, 444, 452, 367, 368

[56] References Cited

U.S. PATENT DOCUMENTS

| | | | |
|---|---|---|---|
| 1,772,377 | 5/1930 | Whittle | 222/148 |
| 1,846,786 | 2/1932 | Brody | 222/288 X |
| 1,861,734 | 6/1932 | Bergmann | 222/219 X |
| 2,259,710 | 10/1941 | Stern | 222/306 X |
| 2,920,796 | 1/1960 | Field | 222/185 |
| 3,204,833 | 9/1965 | Weitzner | 222/355 |
| 4,162,751 | 7/1979 | Hetland et al. | 222/293 |

FOREIGN PATENT DOCUMENTS

| | | | |
|---|---|---|---|
| 13290 | of 1911 | United Kingdom | 222/434 |

*Primary Examiner*—Michael S. Huppert
*Attorney, Agent, or Firm*—Sughrue, Mion, Zinn, Macpeak & Seas

[57] ABSTRACT

A measuring and dispensing apparatus is provided for securing a container of granular, powdered, or other fluidic material thereto, and dispensing pre-determined quantities of the contained material. A dispensing barrel having a known volume is implemented to alternatively receive and dispense the contained material. A volumetric reduction insert is removably insertable into the dispensing barrel to alter the amount of contained material being received and dispensed. The open-ended construction of the dispensing barrel facilitates the removal and insertion of the volume reduction insert therein. A variety of inserts may be provided to increase the gradations of material to be dispensed. A pair of rings are provided for supporting the dispensing barrel for stable operation.

10 Claims, 2 Drawing Sheets

FIG 1
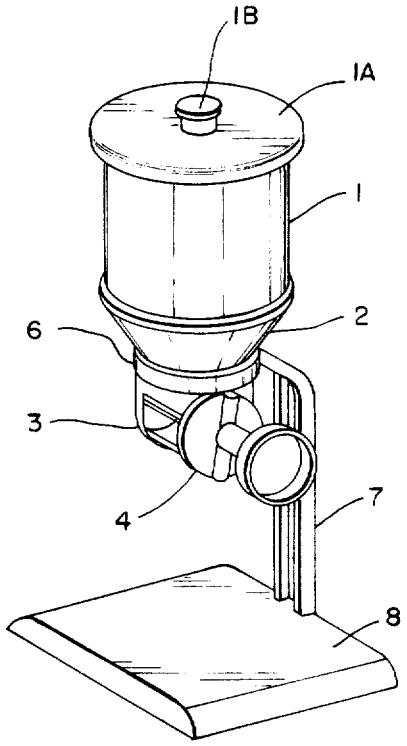
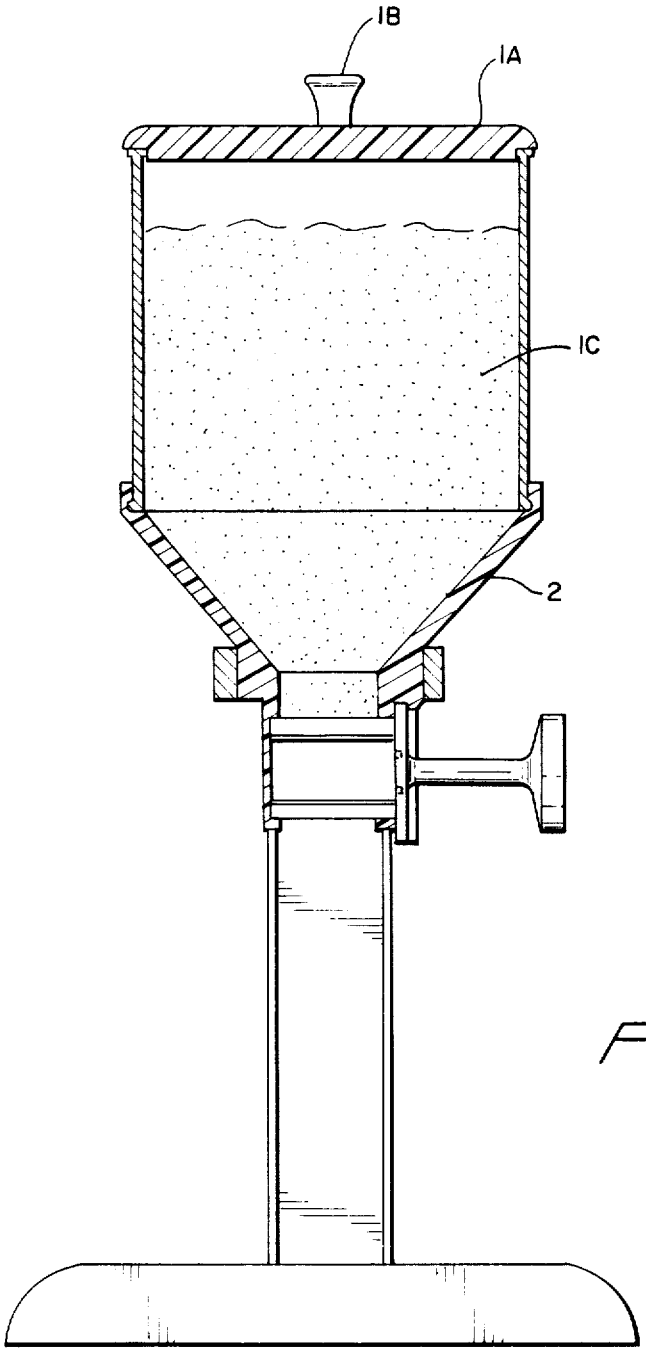
FIG 2

1B
1A
1
2
5
5A
3A
3D
3
3B
3C
4C
4A
4F
6
6A
7
4B
4D
4E
7C
7D
7A
7B
8

CONTROLLED DISPENSING APPARATUS

Matter enclosed in heavy brackets [ ] appears in the original patent but forms no part of this reissue specification; matter printed in italics indicates the additions made by reissue.

BACKGROUND OF THE INVENTION

This invention relates to dispensing devices and, more particularly, to a dispensing device which can engage the rim of containers containing granulated or liquid material and dispense the material within the containers in a plurality of different pre-determined quantities.

With the increase in the variety of packaged foods and commercial products that are in granulated or liquid form, there has developed an increased need for a dispenser by which items, such as powdered artificial creams, powdered hot chocolate, tea, nuts, sugar, instant or ground coffee, as well as vitamins, soup, detergents, cleaners, chemicals, etc., can easily be dispensed in predetermined quantities directly from their original containers. For many of the products, the dispenser should include a means wherein the contents can be extracted from their respective jars or containers under an air-tight sealed condition in order to preserve the freshness and thereby prolong the life of the product. Presently, in order to extract an ingredient, the lid or top must be removed or opened and a spoon or other measuring device must be inserted into the container to remove the desired quantity of material; this quantity will vary depending upon the product and container and one will seldom be able to extract the exact quantity each time.

To overcome this problem, the dispenser should also include means to easily change the desired quantity of material being dispensed.

Since there are great differences in the size and shape of the containers in which materials are packaged, the dispenser should additionally have the versatility to accommodate different containers.

There have been numerous prior dispensing devices; however, each have deficiencies which are overcome by the present invention. U.S. Pat. No. 1,772,377 to Whittle discloses one such prior dispensing device. However, the device has limited utility because it cannot accommodate different containers and has no means to dispense more than one discrete quantity of material from the container.

SUMMARY OF THE INVENTION

The present invention provides means for discharging pre-determined quantities of material. The dispenser eliminates the need for using a measuring cup, spoon or other similar measuring device. The invention has a simple design with relatively few parts so it can quickly and easily be disassembled and reassembled for cleaning.

The funnel-shaped member of the invention, which supports the containers, can be easily disassembled and replaced to support different shape containers, thus allowing great versatility, and thereby enabling the use of containers of a variety of sizes and shapes, such as cans, cardboard containers, different glass or plastic tubes, containers which hold food products and non-edible soap products, cleaners, chemicals, medicine, etc. The funnel-shaped member can also have a threaded base to secure bottles with threads or other twist-on devices to hold the container in a vertical position.

The dispenser and container comprise a base plate for supporting the device, a stand having a yoke at the upper end thereof which is designed to support a dispensing head. A rotatable open-ended barrel is mounted near the lower portion of the dispensing head. The open-ended barrel can selectively receive and discharge materials from the container. The barrel, being open-ended, allows for the insertion of a volumetric reduction means therein.

OBJECTS AND ADVANTAGES OF THE INVENTION

It is a primary object of the present invention to provide a dispenser which can store and dispense a plurality of predetermined quantities of granular or liquid substances in an airtight container.

Another object of the present invention provides a measuring and dispensing device which is easily assembled and disassembled allowing the device to be easily cleaned.

It is still another object of the present invention to provide a dispenser which can accommodate containers having different shapes and sizes.

It is still another object of the present invention to provide a dispenser having relatively few operating parts which is thus less prone to breakage.

It is still another object of the present invention to provide a dispenser which is extremely economical to manufacture due to the simplicity of design.

It is still another object of the present invention to provide a dispenser which can alternately be used for left-handed or right-handed dispensing.

It is another object of the present invention to provide a dispenser in which the quantity of material to be dispensed is easily altered.

BRIEF DESCRIPTION OF THE DRAWINGS

FIG. 1 is a perspective view of the present invention, with a container mounted thereto;

FIG. 2 is a side view of the dispenser in an inverted, non-dispensing mode; and

DESCRIPTION OF THE PREFERRED EMBODIMENT

Figure 3:
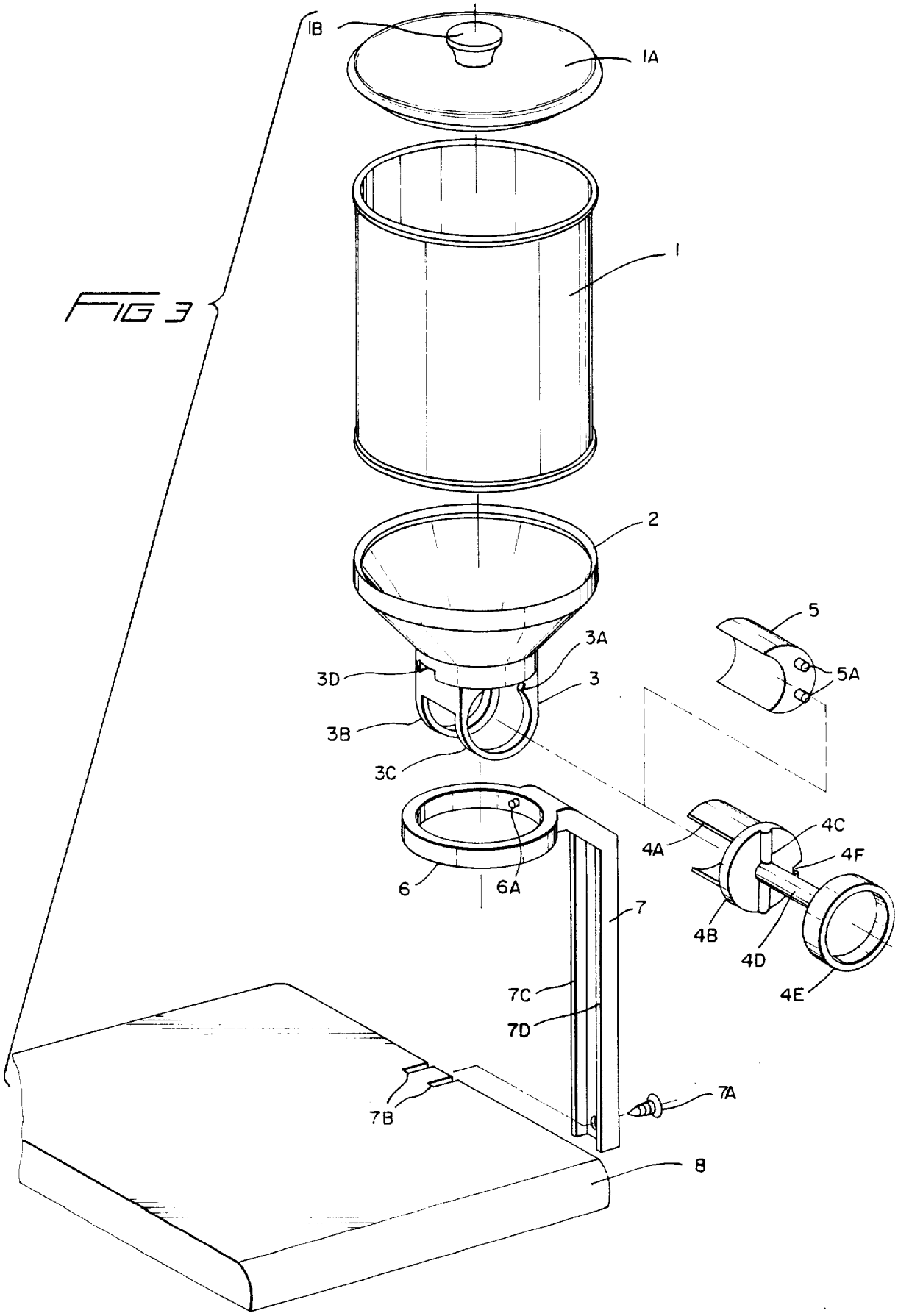
FIG. 3 is an enlarged exploded view taken along the longitudinal axis of the present invention.

The embodiment of the present invention is illustrated generally in FIGS. 1 and 2. FIGS. 1 and 2 show a container or canister 1, containing material 1c with a lid 1a attached to the top of container 1 and handle 1b secured to the lid. The container 1 is supported by a funnel-shape member 2. Referring to FIGS. 1 and 2, material 1c of container 1 flows by gravity into dispensing head 3. Referring now to FIG. 3, there is shown container 1 with lid 1a and lid handle 1b. Container 1 is secured to funnel-shaped member 2 by friction so that the contents of the container 1 may flow by gravity into dispensing head 3. Although a funnel-shaped member 2 is shown in the preferred embodiment, it should be understood that different shaped members more suitable to the product being dispensed and the specific container being dispensed from could be used. For example, it has been found that in coffee cans and the like, the manufacturer of the container provides the bottom rim of the can with a metal lip. With these containers, it is preferred to utilize the manufacturer's lip by providing the funnel-shaped member 2 with a corresponding annular groove so that the bottom of the can snaps into the top of the funnel. For another example, if the container being dispensed from is a bottle, the dispensing head could include a nipple which would correspond to the spout portion of a bottle and thereby allow dispensing when the nipple and spout of the inverted bottle are connected. In a still further embodiment, the funnel-shaped member could have a horizontal surface affixed to an end adjacent to the container. This horizontal surface provides a supporting face when the container is of the rectangular cardboard type. Clips or the like may be provided to secure the cardboard container against the horizontal surface.

Unitarily attached to funnel-shaped member 2 is dispensing head 3. The dispenser head 3 includes two rings, 3b and 3c, extending downwardly from funnel-shaped member 3. As best seen in FIG. 3, ring 3c has an open central area while 3b is closed off to provide an end face for an open-ended barrel 4. The openened barrel 4 includes an indentation 4f which must be aligned with notch 3a of the dispensing head 3 for insertion therein. Notch 3a functions to stabilize the barrel 4 from wobbling and allows the barrel to turn smoothly. The rings 3b and 3c provide additional support for barrel 4. Barrel 4 is unitarily attached to an end face 4b which in turn is unitarily connected to handle 4e by stem 4d. The end face 4b is provided with a transverse rib 4c which engages projection 3a, thereby acting as a stop to limit the rotation of the barrel 4 and thereby allow proper alignment of the open-ended section 4f of the cylindrical barrel 4 with the bore of the dispensing head.

Because of the open-ended design of barrel 4a, a sleeve 5 is insertable to modify the amount of material being dispensed. The sleeve is secured within the barrel by a pair of outwardly extending cylindrical projections 5a which mate, when inserted, with corresponding indentations (not shown in figures) formed in the end face 4b of the barrel. The projections frictionally engage the indentations so as to fixedly secure the sleeve within the barrel, while still providing for easy removal.

Great versatility of the instant apparatus is obtained by selectively employing a variety of inserts, each occupying a different volume. By supplying several sleeves in incremental sizes, virtually any desired amount of material, within the limits of the minimum and maximum volumes of the barrel, may be dispensed.

The sleeves, as well as the barrel, may be provided in a variety of materials, so that caustic or other reactive materials will not react with the barrel or sleeves, themselves.

The dispensing head 3 is secured to yoke 6 through a pair of diametrically opposed partial turn female-male couplings. The head 3 is secured to yoke 6 by a projection 6a which fits into a depression 3d located on the dispensing head. Only one male and one female of the pair of male-female couplings are visible in FIG. 3, as depicted. Additionally, an "O" ring may be provided on either the yoke or the dispensing head to ensure a firm fit therebetween. The yoke 6 is located substantially horizontal to support neck 7. The neck 7 is secured to a base support 8 by screw 7a and support groove 7b which engage the two limbs 7c and 7d of neck 7. If needed, additional support can be provided, for use with heavier canisters, by implementing a wider neck arranged with three or more groove supports in corresponding base grooves. For a three groove piece, two screws provide adequate support.

In an alternative embodiment, not illustrated in the figures, liquid is dispensable in an apparatus, modified to provide liquid-tight dispensing. A gasket or other seal is formed around the periphery of the dispensing barrel, as well as at the location where the container abuts the dispensing head.

It will be appreciated that the instant invention is not limited to the specific embodiments described herein and is intended to encompass those embodiments within the scope and spirit of the appended claims.

What I claim is:

1. A measuring and dispensing apparatus for dispensing granular or liquid materials from a removable container, comprising:

a funnel-shaped member having a first end adapted sealingly and releasably to engage a container and a second end of smaller diameter than said first end having a dispensing head unitarily connected thereto;

said dispensing head comprising two rings extending in a direction opposite from said funnel-shaped member, a first of said rings being open at the center thereof and a second of said rings being closed at the center thereof;

a hollow cylindrical dispensing barrel having a closed end and an open end, said barrel being rotatably and removably supported within said rings such that said closed center of said second ring forms a closed end for said open end of said barrel;

a volumetric reduction means comprising a solid partially cylindrical member having an exterior surface corresponding in shape to an interior surface of said dispensing barrel and an interior surface which cooperates with said interior surface of said dispensing barrel to define therebetween a dispensing volume, said volumetric reduction means being removably secured within said dispensing barrel and removable through said open end of said dispensing barrel such that said dispensing volume can be varied by placing within said dispensing barrel volumetric reduction means having differing interior surfaces; *and* an opening on a longitudinal side of said barrel adjacent to said dispensing volume, such that when said opening is turned upwardly toward said container, some of said material within said container will fill said dispensing volume, and when said opening subsequently is turned downwardly, said material within said dispensing volume will be dispensed from said dispensing volume[; and a yoke for releasably supporting said funnel-shaped member, said yoke in turn being supported by a longitudinally extending neck].

2. The measuring and dispensing apparatus as set forth in claim 1, wherein said first end of said funnel-shaped member further comprises an annular ring disposed inside the periphery thereof for receiving a rim of said container, thereby sealingly and securely to engage said container.

3. A measuring and dispensing apparatus as set forth in claim 1, wherein said first end of said funnel-shaped member further comprises screw-thread means disposed inside the periphery thereof for engaging screw-thread means on said container, thereby sealingly and securely to engage said container.

4. The measuring and dispensing apparatus as set forth in claim 1, wherein said volumetric reduction means further comprises at least one flexible cylindrical projection formed on an end thereof to engage corresponding recesses formed in said closed end of said dispensing barrel.

5. The measuring and dispensing apparatus as set forth in claim 1, wherein said dispensing barrel further comprises on the closed end thereof a knob for rotating said dispensing barrel, and a notch for engaging a projection formed on said first ring of said dispensing head to limit rotational movement of said dispensing barrel.

6. A measuring and dispensing apparatus for dispensing granular or liquid materials from a removable container, comprising:

a funnel-shaped member having a first end adapted sealingly and releasably to engage a container and a second end of smaller diameter than said first end having a dispensing head unitarily connected thereto, said first end of said funnel-shaped member further comprising an annular ring disposed inside the periphery thereof for sealingly and releasably receiving, by snap action, an outwardly extending rim of said container;

said dispensing head comprising two rings extending in a direction opposite from said funnel-shaped member, a first of said rings being open at the center thereof and a second of said rings being closed at the center thereof;

a hollow cylindrical dispensing barrel having a closed end and an open end, said barrel being rotatably and removably supported within said rings such that said closed center of said second ring forms a closed end for said open end of said barrel;

a volumetric reduction means comprising a solid partially cylindrical member having an exterior surface corresponding in shape to an interior surface of said dispensing barrel and an interior surface which cooperates with said interior surface of said dispensing barrel to define therebetween a dispensing volume, said volumetric reduction means being removably secured within said dispensing barrel and removable through said open end of said dispensing barrel such that said dispensing volume can be varied by placing within said dispensing barrel volumetric reduction means having differing interior surfaces; *and* an opening on a longitudinal side of said barrel adjacent to said dispensing volume, such that when said opening is turned upwardly toward said container, some of said material within said container will fill said dispensing volume, and when said opening subsequently is turned downwardly, said material within said dispensing volume will be dispensed from said dispensing volume[; and a yoke for releasably supporting said funnel-shaped member, said yoke in turn being supported by a longitudinally extending neck].

7. A measuring and dispensing apparatus for dispensing granular or liquid materials from a removable container, comprising:

a funnel-shaped member having a first end adapted sealingly and releasably to engage a container and a second end of smaller diameter than said first end having a dispensing head unitarily connected thereto, said first end of said funnel-shaped member further comprising thread means disposed inside the periphery thereof for sealingly and releasably engaging thread means on an outside of said container;

said dispensing head comprising two rings extending in a direction opposite from said funnel-shaped member, a first of said rings being open at the center thereof and a second of said rings being closed at the center thereof;

a hollow cylindrical dispensing barrel having a closed end and an open end, said barrel being rotatably and removably supported within said rings such that said closed center of said second ring forms a closed end for said open end of said barrel;

a volumetric reduction means comprising a solid partially cylindrical member having an exterior surface corresponding in shape to an interior surface of said dispensing barrel and an interior surface which cooperates with said interior surface of said dispensing barrel to define therebetween a dispensing volume, said volumetric reduction means being removably secured within said dispensing barrel and removable through said open end of said dispensing barrel such that said dispensing volume can be varied by placing within said dispensing barrel volumetric reduction means having differing interior surfaces; *and* an opening on a longitudinal side of said barrel adjacent to said dispensing volume, such that when said opening is turned upwardly toward said container, some of said material within said container will fill said dispensing volume, and when said opening subsequently is turned downwardly, said material within said dispensing volume will be dispensed from said dispensing volume[; and a yoke for releasably supporting said funnel-shaped member, said yoke in turn being supported by a longitudinally extending neck].

*8. The measuring and dispensing apparatus as set forth in claim 1, further comprising a yoke for releasably supporting said funnel-shaped member said yoke in turn being supported by a longitudinally extending neck.*

*9. The measuring and dispensing apparatus as set forth in claim 6, further comprising a yoke for releasably supporting said funnel-shaped member, said yoke in turn being supported by a longitudinally extending neck.*

*10. The measuring and dispensing apparatus as set forth in claim 7, further comprising a yoke for releasably supporting said funnel-shaped member, said yoke in turn being supported by a longitudinally extending neck.*

* * * * *